United States Patent Office 3,115,477
Patented Dec. 24, 1963

3,115,477
STABILIZED CYCLIC ANHYDRIDE COMPOSITIONS
William G. Bowman, Pasadena, and Thomas G. Reed, Jr., La Porte, Tex., assignors to Petro-Tex Chemical Corporation, Houston, Tex., a corporation of Delaware
No Drawing. Filed Mar. 29, 1962, Ser. No. 183,394
6 Claims. (Cl. 260—346.8)

This invention relates to dicarboxylic acids and anhydrides and relates more particularly to stable maleic anhydride compositions and derivatives thereof containing small amounts of thiodipropionic acid and its esters.

Maleic anhydride can be prepared by the vapor phase oxidation of straight chain $C_4$ hydrocarbons such as butadiene and butene. While maleic anhydride so prepared can be purified by techniques known to those skilled in the art to provide specification grade material, we have found that maleic anhydride prepared from butene may have a tendency to discolor on long periods of storage. We have been unable to establish any consistency in or assign a reason to this occasional storage discoloration of such maleic anhydride. Further, maleic anhydride is often shipped in molten form in insulated tank cars and is thus maintained in this state for long periods of time. We have also found that under such conditions maleic anhydride may on some occasion darken and become discolored.

It is accordingly an object of this invention to prevent the discoloration of solid maleic anhydride during storage and to eliminate the discoloration of maleic anhydride while being transported and/or stored in a molten stage. It is also an object of this invention to provide nondiscoloring maleic anhydride derived from $C_4$ hydrocarbons. It is another object of this invention to provide nondiscoloring maleic anhydride derivatives and to provide methods for eliminating such discoloration. It is a further object to provide nondiscoloring compositions of organic acids and anhydrides.

In accordance with this invention the above objectives have been achieved quite unexpectedly by the addition to maleic anhydride and derivatives thereof of from about 10 to 1,000 or more parts per million of thiodipropionic acid and esters thereof. When such materials are present in butene-derived maleic anhydride, the tendency of such maleic anhydride to discolor even on long storage and in a molten state is eliminated or is greatly reduced even under extreme temperature conditions as will be demonstrated herein.

While thiodipropionic acid is the preferred material for use in this invention, esters thereof, particularly lower alkyl esters, are also useful in accomplishing the objectives of this invention. Both mono- and diesters may be used. Compounds of the formula

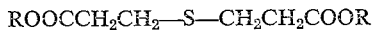

ROOCCH$_2$CH$_2$—S—CH$_2$CH$_2$COOR wherein R is hydrogen or an alkyl radical containing 1 to 16 carbon atoms may be employed; for example, thiodipropionic acid, dimethyl thiodipropionate, dibutyl thiodipropionate, dioctyl thiodipropionate, dilauryl thiodipropionate, the equivalent monoesters and the like. The amount of thiodipropionic acid or esters thereof used may be varied from about 10 to about 1,000 parts per million equivalent of thiodipropionic acid. Larger amounts may be used, as high as 1 percent, but such large amounts are normally not required to obtain a stable maleic anhydride composition. In the amounts of ester used, the amount preferably is related to thiodipropionic acid on a molar basis. In other words, the amount of thiodipropionic ester used should be equivalent to from 10 parts per million to 1,000 parts per million of thiodipropionic acid. An advantage of the thiodipropionic acid and esters is that small amounts can be efficiently employed and such materials do not interfere with subsequent reactions of the maleic anhydride and its derivatives, as in making polyesters and the like, and improved products are obtained because of the presence of the thiodipropionic acid or ester thereof. The thiodipropionic acid or ester thereof may be added to the maleic anhydride at some point in the purification of the maleic anhydride while the maleic anhydride is in a molten state, as after final distillation of the maleic anhydride. Solid maleic anhydride may be melted and the thiodipropionic acid or ester thereof added to the molten maleic anhydride as by stirring.

Maleic anhydride is obtained commercially from two principal sources, by the oxidation of benzene and as a by-product from the oxidation of naphthalene to form phthalic anhydride. Maleic anhydride is produced from benzene by vapor phase oxidation and normally about 1.0 to 1.5 mol percent benzene in air is passed over a vanadium oxide type catalyst. Such catalysts normally contain molybdenum oxide and may be further modified with other metal oxides. The reaction product normally contains maleic anhydride, maleic acid, unreacted benzene, carbon dioxide, water and small amounts of fumaric acid.

Maleic anhydride is also prepared commercially by the oxidation of unsaturated $C_4$ hydrocarbons as butene. Butene is passed in low concentrations in air over a suitable catalyst at temperatures of about 400° C. to about 600° C. Once the reaction is begun, it is self-sustaining. The gaseous feed stream to the oxidation reactors normally will contain air and about 0.75 to about 2.5 mol percent butene. Normally about 1 to about 1.5 mol percent butene is employed for optimum yields of maleic anhydride. The flow rate of the gaseous stream to the reactor may be varied within wide limits but preferably is at a rate of about 50 to about 300 grams of butene per liter of catalyst per hour. The residence time of the gas stream will normally be less than two seconds. A variety of reactors are employed and multiple tube heat exchanger type reactors containing catalyst in the tubes are satisfactory.

The catalysts used for the oxidation of the $C_4$ hydrocarbon may be any type which gives a satisfactory yield of maleic anhydride. The vanadium oxide catalysts are quite useful. For example, a catalyst with an atomic ratio of one atom of vanadium to 0.3 atom of molybdenum gives good yields of maleic anhydride from butene, and the yields thereover may be further improved by the addition of 0.2 atom of antimony. As one method of preparation, molybdenum trioxide is dissolved in alkaline aqueous solution and the vanadium added as ammonium metavanadate. The solution is heated until precipitation occurs in the presence of a carrier. The carriers usually are inert materials as quartz, Vycor, alumina, and the like of from about 2 to 10 mesh size. Antimony oxide may be added before or after precipitation. The catalyst pellets are then dried and placed in the reactor.

The effluent from the reactor containing maleic anhydride and impurities is brought into contact with water in a scrubber whereby the maleic anhydride is converted to maleic acid and the impurities are dissolved and/or entrained in the water. The product discharged from the water scrubber normally contains about 30 to 60 percent water and the maleic acid is normally about 3 to 6 molar. Impurities present in the water solution include aliphatic monocarboxylic acids containing 2 to 6 carbon atoms, such as acrylic acid, acetic acid, crotonic acid, propionic acid, and butyric acid; aliphatic aldehydes of from 2 to 6 carbon atoms, such as acrolein, propionaldehyde, crotonaldehyde and acetaldehyde, and other unidentified impurities including tarry polymers. The aqueous solution is then distilled to remove the water and convert the maleic acid to maleic anhydride.

The crude water-free maleic anhydride is then subjected to a final distillation to provide the high purity maleic anhydride. It is often desirable to conduct this distillation in the presence of small amounts, as .1 to 10 percent, of phosphorous pentoxide at about 140° C. to 200° C. It should be understood that the impurities removed by the phosphorous pentoxide treatment so that the quality of the maleic anhydride is improved are not the same and the problem is different from the later development of color in occasional batches of maleic anhydride after long periods of storage or while maleic anhydride is being shipped or held in a molten condition.

In a typical embodiment of the invention, butene-2 was oxidized with air to maleic anhydride in a gas phase reactor containing 1-inch tubes packed with a $V_2O_5$–$MoO_3$ catalyst prepared as described above. The reactor was heated to 500° C. and 1.5 mol percent butene-2 in air was fed through the reactor. The gaseous effluent from the reactor was dissolved in water in a water scrubber. The resulting maleic acid was distilled to remove excess water of solution and the water formed in the formation of maleic anhydride. The recovered maleic anhydride was then subjected to another distillation in a fractionation column where 0.5 weight percent phosphorous pentoxide was added to the still pot containing the crude maleic anhydride and the maleic anhydride was distilled at a reflux ratio of 15 to 1. An overhead cut amounting to about one weight percent of the charge was discarded and the pure maleic anhydride was then taken off as an overhead with no reflux. The end point of this maleic anhydride distillation was reached when the bottoms temperature rose to about 170° C. The bottom residue was discarded. The resulting maleic anhydride had a purity of greater than 99 percent. The maleic anhydride was then pelleted. Thiodipropionic acid or esters thereof in amounts from about 50 to 500 parts per million normally are mixed into the molten maleic anhydride after distillation by stirring or may be added to the molten maleic anhydride at any stage prior to pelleting. For use in molten maleic anhydride shipped in insulated tank cars or by pipeline, the thiodipropionic acid may be added in the line, in the melting kettle or in the tank car.

As to maleic anhydride to which thiopropionic acid had not been added, occasional life storage samples develop yellow spots or centers and in extreme cases the entire pellets would become yellow. Molten maleic anhydride on life tests also tend to become yellow or yellow-brown on occasion after extended periods in a molten condition at elevated temperatures. The discoloration appeared both in the presence and absence of air. However, with samples of maleic anhydride containing thiodipropionic acids or esters thereof as defined herein, the solid materials did not develop the yellow color or yellow spots even after extended periods of storage of many months, nor did the molten maleic anhydride develop a dark color after hundreds of hours at 55° C.

To demonstrate the effect of adding thiodipropionic acid, a sample of maleic anhydride, prepared from butene which had an initian Hazen* color of less than 10 in a molten state was maintained in the molten state at a temperature of 100° C. After 144 hours at 100° C. the Hazen color value had increased to greater than 50. Another sample containing 50 parts per million of thiodipropionic acid which also had an initial Hazen color value of less than 10 had a Hazen value of only about 20 after 144 hours at 100° C. It will be understood that 144 hours at 100° C. is a severe treatment and was used to accelerate color formation. Since the melting point of maleic anhydride is only 52.85° C., it is not necessary to ship or store maleic anhydride at 100° C. It should also be noted that at a Hazen value of 20 there is no discoloration noticeable to the eye, while at a Hazen value of 40 there is a noticeable dark yellow to brown discoloration.

In another experiment, a sample of maleic anhydride derived from butene was held for 120 hours at 100° C. in an oil bath. This material had an initial Hazen value of less than 10 and after 120 hours the Hazen value was 50 with a yellow-brown discoloration obvious to the eye. When this example was repeated with 100 parts per million of dilauryl thiodipropionate in the maleic anhydride, the Hazen value after 120 hours was only 25 with no obvious discoloration to the eye. In another sample containing 500 parts per million of dilauryl thiodipropionate, the Hazen value after 120 hours was only 15. When this example is repeated with other esters as ethyl and butyl thiodipropionate, even better results are obtained with smaller amounts of the esters.

These additives are also valuable in connection with tetrahydrophthalic anhydride and hexahydrophthalic anhydride derived from maleic anhydride, as well as fumaric, succinic and maleic acid obtained from maleic anhydride, particularly maleic anhydride derived from butene and similar $C_4$ hydrocarbons. To the extent that a color problem is involved with any dicarboxylic acid or anhydride thereof, the thiodipropionic acid and esters thereof are valuable in eliminating or retarding color forming tendencies of such materials on storage or under severe thermal conditions.

We claim:

1. A composition comprising dicarboxylic acid anhydrides as the major component and a color stabilizing amount of a compound of the formula $$ROOCCH_2CH_2\text{—}S\text{—}CH_2CH_2COOR$$

wherein R is selected from the group consisting of hydrogen and alkyl radicals containing 1 to 16 carbon atoms.

2. A composition of matter comprising maleic anhydride and a compound of the formula $$ROOCCH_2CH_2\text{—}S\text{—}CH_2CH_2COOR$$

wherein R is selected from the group consisting of hydrogen and alkyl radicals containing 1 to 12 carbon atoms in amount equivalent to about 10 to about 1,000 parts per million of thiodipropionic acid.

3. A composition of matter comprising maleic anhydride and about 10 to about 1,000 parts per million of thiodipropionic acid.

4. A composition of matter comprising maleic anhydride and about 10 to about 1,000 parts per million of a compound of the formula $$ROOCCH_2CH_2\text{—}S\text{—}CH_2CH_2COOR$$

wherein R is an alkyl radical containing 1 to 12 carbon atoms.

5. A composition of matter comprising materials selected from the group consisting of maleic anhydride, hexahydrophthalic anhydride, tetrahydrophthalic anhydride, maleic acid, fumaric acid and succinic acid containing a color stabilizing amount of a compound of the formula $ROOCCH_2CH_2\text{—}S\text{—}CH_2CH_2COOR$, wherein R is selected from the group consisting of hydrogen and alkyl radicals containing 1 to 12 carbon atoms.

6. The method for improving the color stability of maleic anhydride which comprises incorporating in said

---

*An arbitrarily selected system of color units used to describe color in relation to platinum-cobalt standards. This test is described in Official and Tentative Methods of Analysis of the Association of Official Agricultural Chemists, sixth edition, 1945, p. 629, para. 37.3. The higher numbers represent darker colors.

maleic anhydride a color stabilizing amount of a compound of the formula

ROOCCH$_2$CH$_2$—S—CH$_2$CH$_2$COOR wherein R is selected from the group consisting of hydrogen and alkyl radicals containing 1 to 12 carbon atoms.

References Cited in the file of this patent
UNITED STATES PATENTS

| | | |
|---|---|---|
| 2,397,960 | Gribbins et al. | Apr. 9, 1946 |
| 2,806,861 | Cummings et al. | Sept. 17, 1957 |
| 3,041,251 | Perfetti et al. | June 26, 1962 |